United States Patent [19]

Nusser

[11] Patent Number: 5,574,323
[45] Date of Patent: Nov. 12, 1996

[54] ELECTRONICALLY COMMUTATED ELECTRIC MOTOR FOR DRIVING A FEED PUMP

[75] Inventor: Hermann Nusser, Markgroeningen, Germany

[73] Assignee: Robert Bosch GmbH, Stuttgart, Germany

[21] Appl. No.: 293,273

[22] Filed: Aug. 19, 1994

[30] Foreign Application Priority Data

Sep. 18, 1993 [DE] Germany ................. 43 31 803.7

[51] Int. Cl.⁶ .................... H02K 21/12; H02K 15/00
[52] U.S. Cl. ............................ 310/156; 310/42
[58] Field of Search ........................ 310/156, 218, 310/42, 62, 63

[56] References Cited

U.S. PATENT DOCUMENTS

| | | | |
|---|---|---|---|
| 4,128,365 | 12/1978 | Kemmner et al. | 417/423 |
| 4,219,752 | 8/1980 | Katou | 310/156 |
| 4,591,749 | 5/1986 | Gauthier et al. | 310/156 |
| 4,837,472 | 6/1989 | Kotera | 310/156 |
| 4,850,100 | 7/1989 | Stokes | 29/596 |
| 5,053,664 | 10/1991 | Kikuta et al. | 310/114 |
| 5,237,737 | 8/1993 | Zigler et al. | 29/598 |

FOREIGN PATENT DOCUMENTS

| | | |
|---|---|---|
| 3423316 | 1/1986 | Germany . |
| 61-1247 | 7/1986 | Japan ........................... 310/156 |

*Primary Examiner*—Steven L. Stephan
*Assistant Examiner*—Jonathan Link
*Attorney, Agent, or Firm*—Edwin E. Greigg; Ronald E. Greigg

[57] ABSTRACT

An electronically commutated electric motor for driving fuel feed assemblies for internal combustion engines, that is connected axially flush with a feed pump and is inserted into a common housing. In the housing, the electric motor has a stator that has two stator windings which are supplied with power on alternating sides; a rotor rotates in the stator, disposed in a manner fixed against relative rotation on a rotor shaft supported in the housing. The rotor is embodied as a carrier guided onto the rotor shaft and magnet segments disposed on its circumference face, which according to the invention are held in contact with the carrier via retaining clamps likewise are guided onto the rotor shaft. These retaining clamps are embodied so that, during assembly of the individual elements of the rotor, they take on the task of the centering of the magnet segments during the assembly of the individual parts of the rotor and are braced via compensating disks only after the complete assembly of all rotor elements, in such a way that they keep the magnet segments radially pressed against the carrier of the rotor.

16 Claims, 3 Drawing Sheets

5,574,323

ELECTRONICALLY COMMUTATED ELECTRIC MOTOR FOR DRIVING A FEED PUMP

BACKGROUND OF THE INVENTION

The invention is based on an electronically commutated electric motor as defined hereinafter. An electric motor of this kind, preferably serving to drive a fuel feed assembly for internal combustion engines, is already known from DE-PS 34 23 316, in which the electric motor is inserted into a common housing flush with a fuel feed pump and rotationally drives it to supply fuel. The electric motor has a permanent magnet-bearing rotor whose rotor shaft is supported on the housing. The rotor is encompassed by a stator disposed on the interior wall of the housing, which has stator lamination bundles provided with windings which are supplied with power on alternating sides, electronically controlled via electrical connections. In order to achieve a secure connection between the rotor and the individual permanent magnets disposed on it, which are subjected to a high radial force during operation of the electric motor due to the high speeds, they are in large part extrusion-coated with plastic, which entails a considerable manufacturing expenditure; in particular, this process is very poorly suited to being automated.

OBJECT AND SUMMARY OF THE INVENTION

The electric motor according to the invention has the advantage over the prior art that, by means of the use of retaining elements disposed on the rotor shaft, a simple, easily automatable manufacture of the rotor is possible; the retaining elements simultaneously guarantee a secure attachment of the individual permanent magnet segments as well as their fixation to the rotor shaft. It is especially advantageous to embody the retaining elements as symmetrical retaining clamps having radiating, angled prongs, since this makes possible a simple assembly of the individual magnet segments by means of sliding onto the rotor shaft, which is embodied without shoulders and recesses. The retaining clamps are not prestressed during assembly of the individual rotor parts and furthermore take on the task of centering the individual magnet segments of the permanent magnets via the cooperation of the prongs and the affiliated recesses on the magnet segments of the rotor's magnet packet. The bracing of the retaining clamps with reference to the magnet segments or the entire rotor is advantageously achieved for the first time via putting on the second compensating disk which axially fixes the retaining clamps, by means of which the retaining clamps are pressed into axial contact with the rotor, which exerts overpressure on the curvatures of the surfaces of the retaining clamps so that they now act radially in a prestressed fashion upon the magnet segments. It is especially advantageous to carry out the recesses embodied as longitudinal grooves on the magnet segments so that each longitudinal groove that receives a prong of the retaining clamps is formed by means of two neighboring magnet segments, since in this manner each segment is guided and retained on two engagement surfaces, and is therefore uniformly guided and retained.

A further advantage is achieved by means of the axial securing of the retaining clamps by means of compensating disks, since these can additionally take on the function of balancing the rotor, while material can be removed if need be in a simple manner by means of bores in them.

In order to be able to increase the sturdiness of the rotor even further if necessary, it is advantageously further possible to slip over the outer diameter of the rotor a thin-walled sleeve, which is flanged against the rotor on its ends.

The invention will be better understood and further objects and advantages thereof will become more apparent from the ensuing detailed description of a preferred embodiment taken in conjunction with the drawings.

DESCRIPTION OF THE PREFERRED EMBODIMENTS

Figure 1:
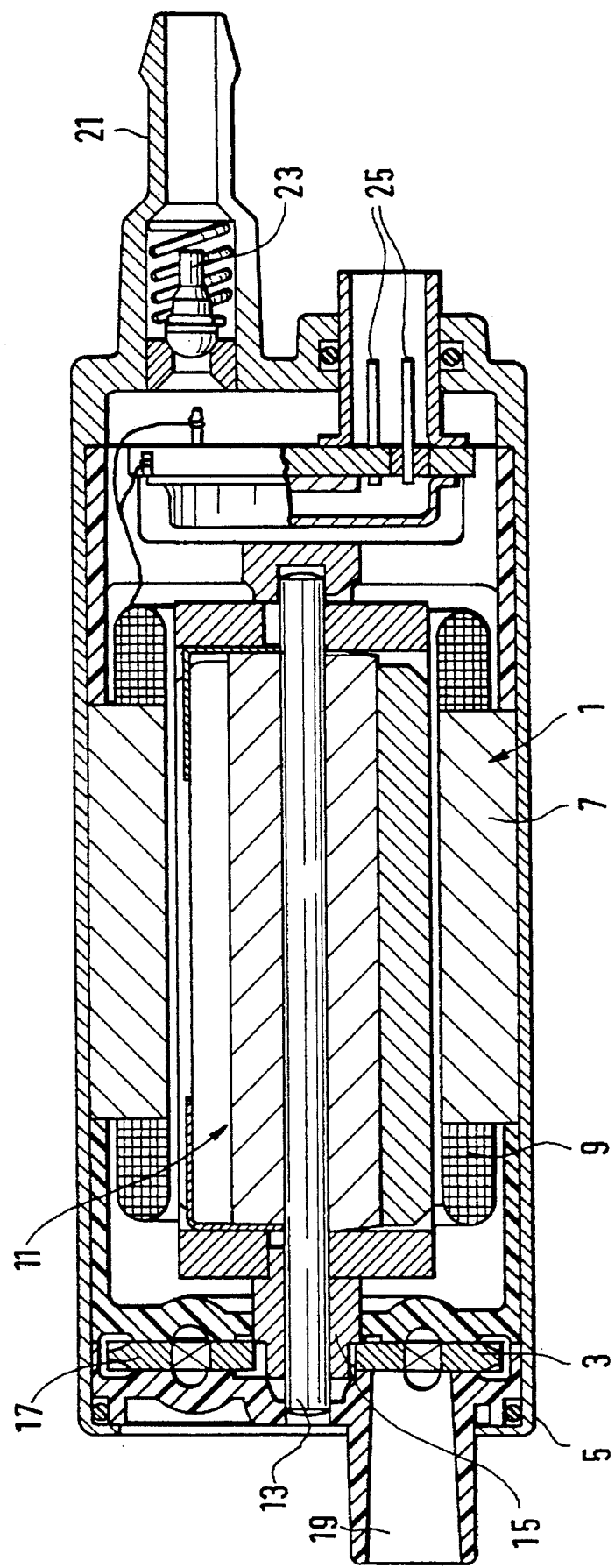
FIG. 1 shows a fuel feed assembly having an electronically commutated electric motor which drives a fuel feed pump.

FIG. 1 shows a longitudinal section of a fuel feed assembly for delivering fuel from a fuel reservoir to an internal combustion engine which has an electronically commutated electric motor 1 and a feed pump 3 driven by the motor, which are disposed in a known manner in a common housing 5. The electric motor 1 has a stator 7 held in a known manner in the housing 5, having a multiphase stator winding 9, which is supplied with power on alternating sides, and a rotor 11 which rotates in the stator 7, which rests unrotatably on a rotor shaft 13 supported in the housing 5. On its one face end, the rotor 11 of the electric motor 1 is connected unrotatably by means of a coupling part 15 to a feed wheel 17 or a feed vane 17 of the feed pump 3, which wheel or vane for its part is likewise guided on the rotor shaft 13 and is furthermore axially disposed between two feed pump parts retained in the housing 5, which each have a through flow opening for the fuel; the outer pump part has a fuel intake fitting that protrudes out from the face end of the housing 5. To allow for a fuel outlet of the fuel fed by means of the feed pump 3 and flowing through the electric motor 1, on its face end remote from the feed pump 3, the feed assembly has a pressure connection fitting 21, to which a fuel feed line is attached and into which a check valve 23 can be integrated. Furthermore the flow connections 25 connected to the stator winding 9 lead away from the face end of the housing 5 remote from the pump and can be connected on the other side to an electronic commutation device, not shown.

Figure 2:
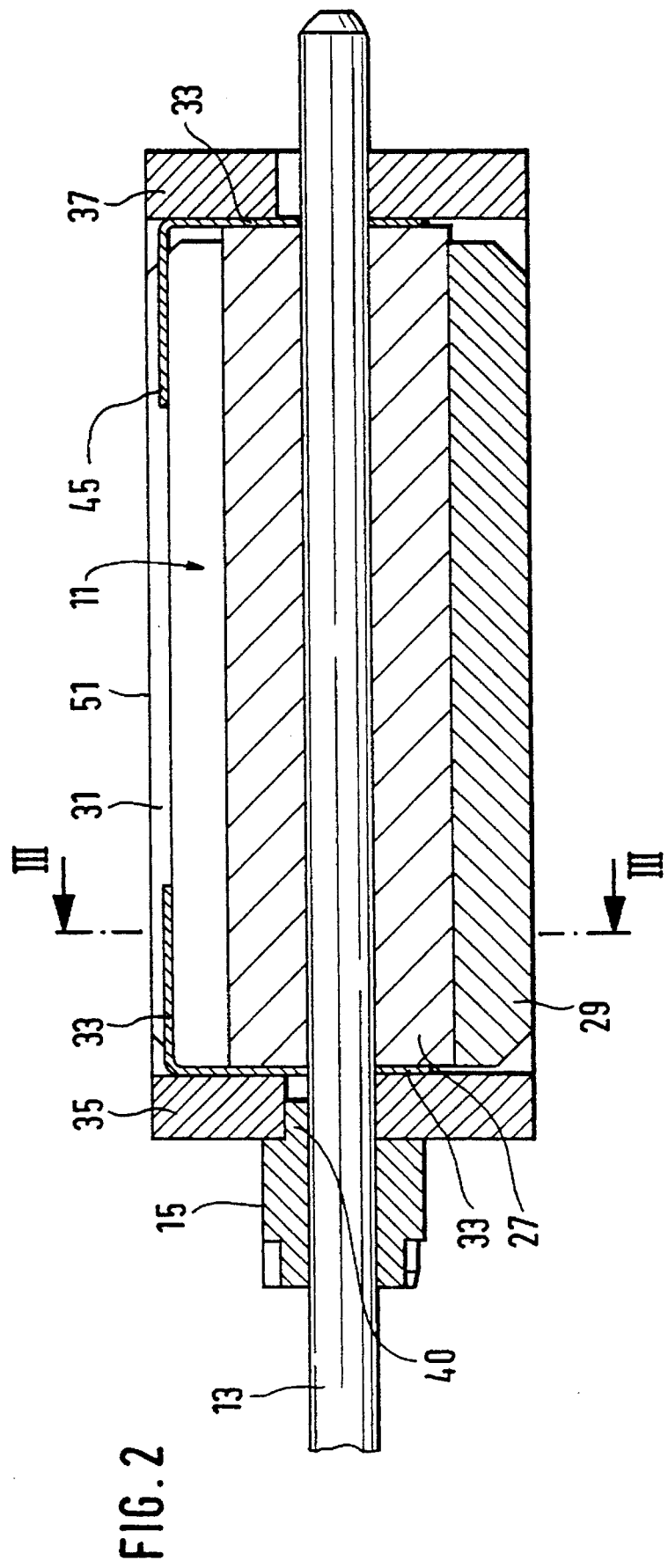
FIG. 2 shows an enlargement of a section through the rotor of the electric motor shown in FIG. 1.
Figure 3:
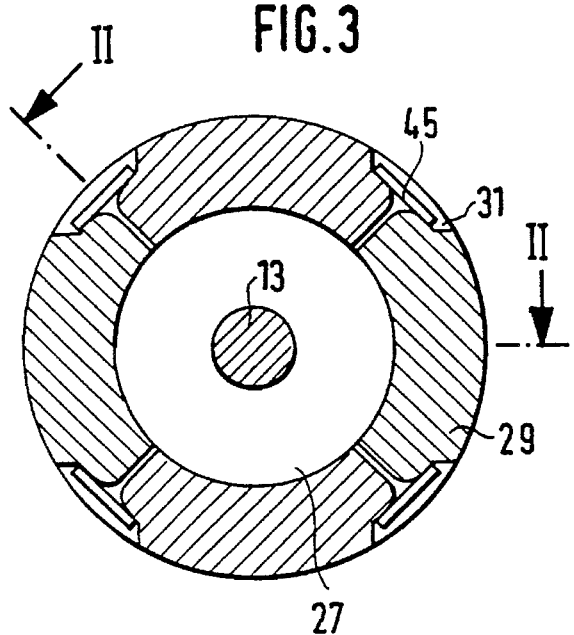
FIG. 3 shows a section through the rotor shown in FIG. 2.

The enlarged sections through the rotor 11 shown in FIGS. 2 and 3 should clarify the construction of the rotor 11 of the electric motor 1, which construction is essential to the invention. The rotor 11 has a hollow, cylinder-shaped lamination packet 27, which is made up of axially laminated individual sheet metal plates, disposed on the rotor shaft 13, and serves as a carrier for four prismatic permanent magnet segments 29, which form a circular ring and rest on the outer circumference of the carrier, and consequently form a magnet packet of the rotor 11. On both of their sides that adjoin them to one another, the magnet segments 29 have recesses in the form of steppings, which are disposed so that each pair of adjoining magnet segments 29 forms a common longitudinal groove 31 on the edges of the two magnet segments 29 oriented toward one another. The lamination packet 27 and the four magnet segments 29 disposed on it are each axially fixed by a retaining element in the form of a retaining clamp 33; the retaining clamps 33 are likewise guided onto the rotor shaft 13 and for their part are each axially acted upon by a compensating disk 35, 37 on the end remote from the lamination packet 27.

Figure 5:
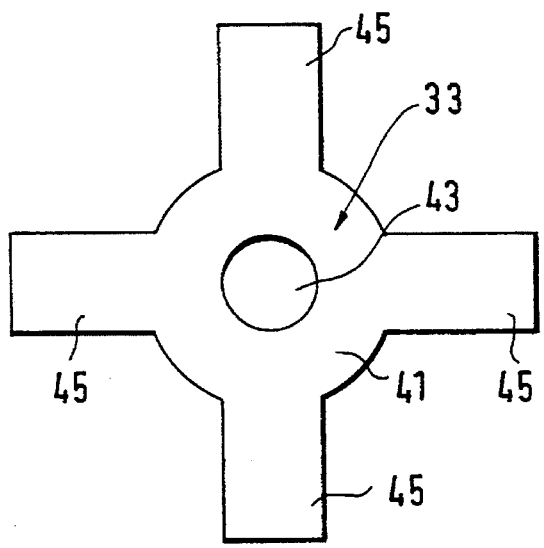
FIGS. 5 and 6 show two views of the retaining clamp.
Figure 6:
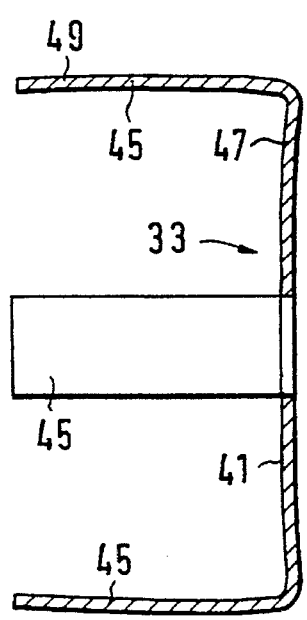

To secure the radial contact of the magnet segments 29 with the lamination packet 27, the retaining clamps 33 have a construction which can be inferred from FIGS. 5 and 6. The retaining clamps 33 are preferably embodied as a one-piece shaped sheet metal part, having a disk-shaped base body 41, which has a central bore 43 for guiding it onto the rotor shaft 13 as well as four equidistantly spaced, radially protruding and then angled strips of sheet metal, which each form a retaining prong 45. With these prongs 45, whose width corresponds to the measure of the width of the longitudinal grooves 31 in the magnet segments 29, the retaining clamps 33, when they are slid onto the rotor shaft 13 and on their face end, come into contact with the lamination packet 27, hold the magnet segments 29 in radial contact with the lamination packet 27; a first prong section 47, which extends radially from the base body 41, together with the base body 41 secures the magnet segments 29 axially and a second prong section 49, bent approximately at right angles to the first and engaging the longitudinal groove 31, secures the magnet segments 29 radially.

For a simple assembly of the rotor 11, in order to achieve a radial contact force of the prongs 45 acting upon the magnet segments 29 only after the complete assembly of all elements, the prongs 45 of the retaining clamps 33 are bent (e.g., more than 90°) so that they exert a radial contact force upon the magnet segments 29 only after the axial bracing by means of both of the compensating disks 35, 37. The first section 47 of the prongs 45 can have a bend away from the second section 49 or the magnet segments 29 and the second prong section 49 is bent toward the base body 41.

Figure 4:
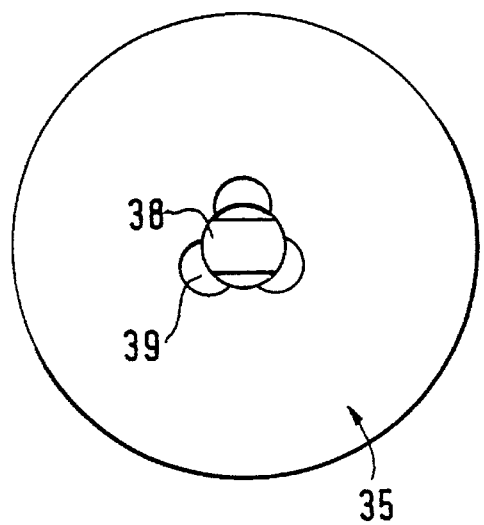
FIG. 4 shows a compensating disk.

FIG. 4 shows an enlargement of one of the compensating disks 35, 37, which axially fixes the rotor 11 on the rotor shaft 13 and braces its elements. The compensating disk 35 has recesses 39, which are preferably embodied as bores that intersect a central guide bore 38 and which are engaged by the axially protruding catch elements 40 of the coupling part 15 so that a form-fitting connection, in a manner fixed against relative rotation, is produced between the compensating disk 35 and the coupling part 15, the disk in turn being joined in a manner fixed against relative rotation to the rotating part 17 of the feed pump 3 shown in FIG. 1. The outer diameter of the compensating disks 35, 37 is selected to be at least as large as the outer diameter of the retaining clamps 33.

To achieve a high degree of security against a dislocation of the individual permanent magnet segments 29, it is furthermore possible to slip a thin-walled sleeve 51 over the outer circumference of the compensating disk 35, 37 and the magnet segments 29 and to axially secure them so that the rotor 11 is closed off around its entire circumference.

The assembly of the rotor 11 of the electric motor 1 according to the invention is conducted as follows.

First, the compensating disk 35 is pressed onto the rotor shaft 13 by means of the central guide bore 38. Then a retaining clamp 33 is slid onto the rotor shaft 13 so that its base body 41 contacts the compensating disk 35; the angled section 49 of the prongs 45 points away from the compensating disk 35. As the assembly continues, the lamination packet 27 and the four magnet segments 29 are now slipped on with play; the unstressed retaining clamp 33 takes on the task of pre-centering the magnet segments 29. Then the second retaining clamp 33 is likewise slid onto the rotor shaft 13 so that the prongs 45 protrude into the longitudinal groove 31 of the magnet segments 29. The actual stressing of the retaining clamps 33 is then achieved by means of the pressing on of the second compensating disk 37, which is braced against the first compensating disk 35 and thus exerts overpressure on the curvature of the prongs 45 of both retaining clamps 33, which press the angled prong sections 49 radially onto the magnet segments 29 and brace them against the lamination packet 27. Now it is possible to slide the sleeve 51 over the outer diameter of the magnet segments 29, which have wide tolerances.

Finally, the thin-walled sleeve 51 is pulled over the outer diameter of the compensating disks 35, 37 and the magnet segments 29 and is flanged onto the compensating disks 35, 37.

To guarantee a smooth motion of the rotor 11, it is balanced when assembled by removing material from the compensating disks 35, 37, for example by making bores in the disks.

Consequently, it is simple to manufacture an electronically commutated electric motor whose rotor has a high degree of security against shifting of the individual elements in relation to one another even at high speeds and high centrifugal forces, and whose manufacture can furthermore be easily automated.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An electronically commutated electric motor for driving a feed pump (3) in a housing (5) of a fuel feed assembly for internal combustion engines having a stator (7) disposed in the housing (5), said stator is provided with windings (9), which include connections (25) that are connected to an electronic commutation device, a rotor (11) fixed on a rotor shaft (13) supported in the housing (5), said rotor shaft rotates coaxially to the stator (7) and said stator (7) is disposed in a manner fixed against relative rotation, the rotor (11) is embodied as a carrier (27) mounted on and axially secured to the rotor shaft (13), several permanent magnets are disposed on a circumferential face of said carrier, a coupling part (15) is rotatably connected to the rotor (11), which connects the rotor (11) to a rotating part (17) of the feed pump (3), the permanent magnets form a circular ring that encompasses the carrier (27) of the rotor (11), said circular ring has four magnet segments (29) which are held in contact with a radial circumferential face of the carrier (27) by means of two retaining elements, which are guided on the rotor shaft (13) and which axially define the rotor (11), the retaining elements each have several prongs (45), which correspond to the number of magnet segments (29) and which encompass the magnet segments (29) essentially parallel to their circumferential face; the prongs (45) protrude into and engage recesses of the magnet segments (29), each of the retaining elements are embodied as a one-piece retaining clamp (33) having a disk-shaped base body (41) in which a bore (43) is disposed, said bore corresponds to the diameter of the rotor shaft (13), and from which the prongs (45) radiate, said prongs are embodied as angled sheet metal strips, which are bent toward the rotor axis, wherein the prongs (45) are spaced equidistant from one another.

2. The electric motor according to claim 1 which includes two prong sections and both prong sections (47, 49) run essentially at right angles to each other, and are bent so that after an axial bracing of the retaining clamps (33), upon contact of the base body (41) with the face end of the carrier (27), the prongs are pressed radially inwards against the magnet segments (29).

3. The electric motor according to claim 1, in which the recesses of the magnet segments are comprised of steppings provided on both long sides of the magnet segments (29), each of which, together with the respective stepping of the neighboring magnet segment (29) forms a longitudinal groove (31).

4. The electric motor according to claim 2, in which a compensating disk (35, 37) contacts the face end of the base body (41) of each of the retaining clamps (33) remote from the carrier (27), said disk is guided by means of a guide bore (38) onto the rotor shaft (13) and is fixed in its axial position and the retaining clamps (33) are axially braced against carrier (27) and magnet segments (29), wherein the outer diameter of the compensating disks (35, 37) is at least as great as the radial span of the retaining clamps (33) and the magnet segments (29).

5. The electric motor according to claim 4, in which the compensating disk (35) has guide bore recesses (39) leading from its guide bore (38); the coupling part (15) between rotor (11) and feed pump (3) engages these recesses (39) having a positive fit with catch elements (40) that protrude out axially from the coupling part (15).

6. The electric motor according to claim 5, in which the guide bore recesses (39) are embodied as bores in the compensating disk (35).

7. The electric motor according to claim 5, in which the coupling part (15) is made of plastic and is guided onto the rotor shaft (13) by means of an axial through bore and is rotatably connected on its face end remote from the compensating disk (35) to a rotating part (17) of the feed pump (3).

8. The electric motor according to claim 1, in which a thin-walled sleeve (51) encompasses the radial circumference face of the permanent magnets.

9. The electric motor according to claim 1, in which the carrier (27) of the rotor (11) is embodied as a lamination packet made up of laminated individual sheet metal plates.

10. The electric motor according to claim 2, in which the carrier (27) of the rotor (11) is embodied as a lamination packet made up of laminated individual sheet metal plates.

11. The electric motor according to claim 3, in which the carrier (27) of the rotor (11) is embodied as a lamination packet made up of laminated individual sheet metal plates.

12. The electric motor according to claim 4, in which the carrier (27) of the rotor (11) is embodied as a lamination packet made up of laminated individual sheet metal plates.

13. The electric motor according to claim 5, in which the carrier (27) of the rotor (11) is embodied as a lamination packet made up of laminated individual sheet metal plates.

14. The electric motor according to claim 6, in which the carrier ( 27 ) of the rotor ( 11 ) is embodied as a lamination packet made up of laminated individual sheet metal plates.

15. The electric motor according to claim 7, in which the carrier (27) of the rotor (11) is embodied as a lamination packet made up of laminated individual sheet metal plates.

16. The electric motor according to claim 8, in which the carrier (27) of the rotor (11) is embodied as a lamination packet made up of laminated individual sheet metal plates.

\* \* \* \* \*